(12) United States Patent
Harris et al.

(10) Patent No.: US 7,645,471 B2
(45) Date of Patent: Jan. 12, 2010

(54) PROCESSES FOR COATING AN ANIMAL FEED TO OBTAIN COATED ANIMAL FEED PRODUCTS

(75) Inventors: Joseph M. Harris, Montgomery, TX (US); Paul Mostyn, Magnolia, TX (US)

(73) Assignee: Westway Trading Corporation, New Orleans, LA (US)

( * ) Notice: Subject to any disclaimer, the term of this patent is extended or adjusted under 35 U.S.C. 154(b) by 750 days.

(21) Appl. No.: 11/242,277

(22) Filed: Oct. 3, 2005

(65) Prior Publication Data

US 2007/0077334 A1 Apr. 5, 2007

(51) Int. Cl.
*A23K 1/00* (2006.01)

(52) U.S. Cl. .................... 426/89; 426/302; 426/303; 426/304; 426/658; 426/805; 426/623; 426/630; 426/635; 426/601

(58) Field of Classification Search .................... 426/89, 426/658, 601, 302, 303, 304, 807, 623, 630, 426/635
See application file for complete search history.

(56) References Cited

U.S. PATENT DOCUMENTS

| | | | |
|---|---|---|---|
| 3,413,118 A | | 11/1968 | Kviesitis |
| 3,682,653 A | * | 8/1972 | Mommer ...................... 426/309 |
| 4,089,979 A | * | 5/1978 | Jackson ........................ 426/69 |
| 4,117,801 A | | 10/1978 | Dannelly et al. |
| 4,431,675 A | | 2/1984 | Schroeder et al. |
| 4,542,031 A | * | 9/1985 | Nakajima et al. ............ 426/307 |
| 4,937,083 A | | 6/1990 | Itagaki et al. |
| 4,996,067 A | | 2/1991 | Kobayashi et al. |
| 5,030,463 A | | 7/1991 | Evans |
| 5,156,870 A | * | 10/1992 | Evans ........................ 426/309 |
| 5,190,775 A | * | 3/1993 | Klose ............................ 426/2 |
| 5,204,102 A | | 4/1993 | Coles et al. |
| 5,363,754 A | | 11/1994 | Coles et al. |
| 5,750,466 A | | 5/1998 | Wedegaertner et al. |
| 5,871,773 A | | 2/1999 | Rode et al. |
| 5,972,414 A | * | 10/1999 | Harris ........................ 426/630 |
| 6,051,269 A | | 4/2000 | Harris |

FOREIGN PATENT DOCUMENTS

| | | | |
|---|---|---|---|
| AU | 62644/90 B | * | 3/1991 |
| SU | 959743 A | * | 9/1982 |

* cited by examiner

*Primary Examiner*—C. Sayala
(74) *Attorney, Agent, or Firm*—Todd E. Albanesi; Booth Albanesi Schroeder LLC

(57) ABSTRACT

A process of coating an animal feed to obtain a coated animal feed product is provided. The process includes the step of applying a first coating to the animal feed, wherein the first coating comprises at least 20% by weight of sugar selected from the group consisting of monosaccharide, disaccharide, and any combination thereof in any proportion. The process also includes the step of applying a second coating to the animal feed, wherein the second coating comprises at least 20% by weight of phospholipid.

39 Claims, No Drawings

PROCESSES FOR COATING AN ANIMAL FEED TO OBTAIN COATED ANIMAL FEED PRODUCTS

TECHNICAL FIELD

The processes and products according to the invention generally relate to animal feed. More particularly, the processes and products relate to coating an animal feed with a first coating with sugar therein and a second coating with feed grade fat therein.

BACKGROUND OF THE INVENTION

Numerous efforts have been made to improve the nutritive value, digestibility, palatability, shelf-life, and appearance of animal feed products.

U.S. Pat. No. 3,413,118 issued Nov. 26, 1968 and having for named inventor Boris Kviesitis describes a livestock feed containing a non-protein nitrogen compound selected from urea and ammonium salts. The non-protein nitrogen compound is in the form of particles coated with an emulsion comprised of propylene glycol, vegetable oil, vegetable wax and lecithin, and a quantity of a palatability increasing agent which is absorbed in the coating.

U.S. Pat. No. 4,117,801 issued Oct. 3, 1978 and having for named inventors Clarence C. Dannelly and Charles R. Leonard discloses an apparatus for spray coating discrete particles while the particles are suspended in a gas flow, the apparatus including a vertically disposed coating chamber; a gas receiving, compressing and accelerating enclosure open at the top and bottom, such as a truncated hollow cone, within the chamber and including therewithin coating and drying zones and forming on the outside thereof therebetween it and the inside wall surface of the coating chamber an annular storage zone for a load of the discrete particles; one or more gas shaping or aerodynamic structures centrally disposed in spaced relation below the truncated hollow cone defining therebetween with the apparatus inside wall surface an annular nozzle for a Coanda flow of upwardly moving gases substantially into the truncated hollow cone; a particle supporting screen between the truncated hollow cone and the aerodynamic structure(s); at least one spray nozzle extending above the central aerodynamic structure and projecting through the particle supporting screen for providing an atomized spray of coating material within the truncated hollow cone; and a source of upwardly moving gases from below the aerodynamic structure(s).

U.S. Pat. No. 4,431,675 issued Feb. 14, 1984 to named inventors Jack J. Schroeder and John E. Findley discloses a sugar solution-based, preferably molasses-based, animal feed supplement which is produced as a viscous liquid that is gelled into a hard solid by the addition of a soluble calcium salt or oxide, preferably calcium oxide, a soluble phosphate, and a substantial quantity of magnesium oxide. Prior to its solidification a limited amount of discrete cellulose fibers can also be added to reinforce the solid and prevent its cracking. The solid product is hard and water resistant and has a limited consumption rate.

U.S. Pat. No. 5,030,463 issued Jul. 9, 1991 and having for named inventor Jeffrey C. Evans discloses a coating for animal feeds; more particularly a coating composition comprising cane molasses for animal feeds which provides a golden brown color and free-flow characteristics to such feeds. When cane molasses or cane molasses/fat is treated with phosphoric acid, phosphate or polyphosphate salts, or various acids, the resulting composition provides a golden brown color, improves the free-flow characteristics, and improves tackiness retention of the feed to which it is applied. Addition of an emulsifier to a cane molasses/fat coating composition eliminates spottiness.

U.S. Pat. No. 5,204,102 issued Apr. 20, 1993 and having Richard G. Coles and Ian J. Broadfoot as named inventors, discloses a process and apparatus for treating cottonseed to make an animal feedstuff. The process preferably includes the steps of initially partially delinting the whole cottonseed by singeing the cottonseed in an open flame and removing the charcoal that is produced during such singeing by abrasion such as passing the flame delinted seed through a buffing trommel. The partially delinted cottonseed is then coated with a "binder" and a "filler" combination to cement the cotton fibers to the seed and provide a cementitious base to which the filler is adhered so as to completely encapsulate the seed and provide an integral flowable product. The binder initially has a sticky or tacky consistency but is capable of setting to a solid state when mixed with the filler. The suitable "binders" are gums such as gum arabic, starches, lignasite, and molasses. The suitable "fillers" are inert mineral powders such as calcium carbonate, lime, diatomaceous earth, forms of clay such as bentonite and kaolin, extruded or textured proteins such as those derived from soybeans, and ground cereal grains such as corn, wheat, barely, maize, and sorghum, and mixtures thereof. Optional "additives" to the coating are generally described as vitamins, minerals, trace elements, veterinarian products for the prevention, control or eradication of disease, and growth stimulating factors. U.S. Pat. No. 5,363,754 issued Nov. 15, 1994 and having Richard G. Coles and Ian J. Broadfoot as named inventors is a continuation-in-part of U.S. Pat. No. 5,204,102 that expands its definition of "binders" to include a syrup such as corn syrup.

U.S. Pat. No. 5,750,466 issued May 12, 1998 and having Thomas C. Wedegaertner, Thomas D. Valco, and William F. Lalor as named inventors discloses coating linter-bearing cottonseed with starch and one or more biologically related materials generally described as being selected from the group consisting of vitamins, feed supplements, oils, fats, ores, rodent repellants, insect repellants, medications, anti-germination agents, and preservatives for use as an animal feed and as planting stock. The starch coating is intended to allow the cottonseed to be used in conventional feed handling and seed planting equipment. According to U.S. Pat. No. 5,750,466, the process for coating cottonseed consists essentially of the steps of: (a) spraying linter-bearing cottonseed with a coating consisting essentially of a hot, aqueous, gelatinized starch suspension, optionally containing one or more of the listed biologically related materials; (b) drying the starch suspension coated cottonseed to yield starch coated cottonseed; (c) disaggregating the starch coated cottonseed; and (d) cooling and: storing the starch-coated cottonseed.

U.S. Pat. No. 5,871,773 issued Feb. 16, 1999 to named inventors Lyle M. Rode, William E. Julien, Hiroyuki Sato, Takeshi Fujieda, and Hiroyuki Suzuki discloses combining a rumen-protected lysine and/or methionine composition with a standard animal feed wherein a lysine and/or methionine core composition is protected with a coating of lecithin, at least one inorganic substance which is stable in neutrality and soluble under acidic conditions, and at least one substance selected from saturated or unsaturated monocarboxylic $C_{14}$-$C_{22}$ acids, salts thereof, hardened vegetable oils, hardened animal oils, and waxes, wherein the methionine source to lysine source weight ratio in the core, when methionine is present, is from 1/10 to 10/1, preferably 1/3. More particularly, U.S. Pat. No. 5,871,773 discloses a preferred embodiment wherein the lecithin is present in an amount of from 0.1% to 20% by weight and the inorganic substance is used in an amount from 0.1 to 10% by weight, based on the weight of the coating composition. It also discloses a rumen-protected lysine/methionine composition wherein the core is coated with substances including a polymer as described in U.S. Pat. Nos. 4,996,067 and 4,937,083.

U.S. Pat. No. 5,972,414 issued Oct. 26, 1999 to named inventor Joseph M. Harris discloses a process of treating whole cottonseed to improve the handleability and digestibility of the cottonseed is provided. In general, the process comprises the steps of: (a) adjusting the pH to equal or less than three of an aqueous composition having a sugar concentration of at least 5 percent by weight; and (b) applying the aqueous composition to whole cottonseed. According to another aspect of the invention, the process further comprises the step of drying the whole cottonseed after applying the aqueous composition. According to a modified process of treating whole cottonseed to improve the handleability and digestibility of the cottonseed, the process comprises the steps of: (a) applying an aqueous sugar composition having a sugar concentration to of at least 5 percent by weight to the whole cottonseed; and (b) applying an acidic aqueous solution having a pH equal to or less than three to the whole cottonseed. According to yet another aspect of the invention, the treated whole cottonseed product of the process is used as a new feed ingredient for animal feed, particularly a ruminant.

U.S. Pat. No. 6,051,269 issued Apr. 18, 2000 to named inventor Joseph M. Harris discloses a process of treating whole cottonseed to improve the handleability and digestibility of the cottonseed is provided. In general, the process comprises the steps of: (a) adjusting the pH to equal or greater than eight of an aqueous composition having a sugar concentration of at least 5 percent by weight; and (b) applying the aqueous composition to whole cottonseed. According to another aspect of the invention, the process further comprises the step of drying the whole cottonseed after applying the aqueous composition. According to a modified process of treating whole cottonseed to improve the handleability and digestibility of the cottonseed, the process comprises the steps of: (a) applying an aqueous sugar composition having a sugar concentration of at least 5 percent by weight to the whole cottonseed; and (b) applying a basic aqueous solution having a pH equal to or greater than eight to the whole cottonseed. According to yet another aspect of the invention, the treated whole cottonseed product of the process is used as a new feed ingredient for animal feed, particularly a ruminant.

Thus, a long-felt and continuing need exists for processes and compositions that improve the nutritive value, digestibility, palatability, shelf-life, and appearance of animal feed products.

SUMMARY OF THE INVENTION

According to the invention, a process of coating an animal feed to obtain a coated animal feed product is provided. The process includes the step of applying a first coating to the animal feed, wherein the first coating comprises at least 20% by weight of sugar selected from the group consisting of monosaccharide, disaccharide, and any combination thereof in any proportion. The process also includes the step of applying a second coating to the animal feed, wherein the second coating comprises at least 20% by weight of phospholipid.

These and further aspects of the invention are most advantageously and synergistically practiced together. These and further aspects and advantages of the invention will become apparent to persons skilled in the art from the following detailed description of presently most-preferred embodiments of the invention.

DETAILED DESCRIPTION OF PREFERRED EMBODIMENTS

The present inventions will be described by referring to compositions and processes showing various examples of how the inventions can be made and used.

As used herein and in the appended claims, the words "comprise," "has," and "include" and all grammatical variations thereof are each intended to have an open, non-limiting meaning that does not exclude additional elements or parts of an assembly, subassembly, or structural element.

Feed grade fat is a class of lipid that is suitable for use as animal feed. Lipid is a broad class of organic products found in living systems. Most are insoluble in water but soluble in nonpolar solvents. In living organisms lipids serve as the basis of cell membranes and as a form of fuel storage. Most lipids have some polar character in addition to being largely nonpolar. Generally, the bulk of their structure is nonpolar or hydrophobic ("water-fearing"), meaning that it does not interact well with polar solvents like water. Another part of their structure is polar or hydrophilic ("water-loving") and will tend to associate with polar solvents like water. This makes them amphiphilic molecules (having both hydrophobic and hydrophilic portions).

Phospholipid is a lipid formed from four components: fatty acids, a negatively charged phosphate group, an alcohol and a backbone. The resulting compound called phosphatidic acid contains a region (the fatty acid component) that is fat-soluble along with a region (the charged phosphate group) that is water-soluble. In the case of phospholipids, the polar groups are considerably larger and more polar than other lipids.

Most phospholipids also have an additional chemical group bound to the phosphate. For example, it may be connected with choline; the resulting phospholipid is called phosphatidylcholine, or lecithin. Other phospholipids include phosphatidylglycerol, phosphatidylinositol, phosphatidylserine, and phosphatidylethanolamine.

In its simplest form, phospholipid is composed of glycerol bonded to two fatty acids and a phosphate group. Phospholipids with a glycerol backbone are known as glycerophospholipids or phosphoglycerides. They are the main component of biological membranes. Phosphoglycerides are built on a glycerol core to which are linked two fatty acid-derived "tails" by ester linkages and one "head" group by a phosphate ester linkage. Fatty acids are unbranched hydrocarbon chains, connected by single bonds alone (saturated fatty acids) or by both single and double bonds (unsaturated fatty acids). The chains are usually 10-24 carbon groups long. The head groups of the phospholipids found in biological membranes are phosphatidylcholine (lecithin), phosphatidylethanolamine, phosphatidylserine and phosphatidylinositol, whose head group can be modified by the addition of one to three more phosphate groups.

The bipolar character of phospholipids is essential to their biological function in cell membranes. The fat-soluble portions associate with the fat-soluble portions of other phospholipids while the water-soluble regions remain exposed to the surrounding solvent. The phospholipids of the cell membrane form into a sheet two molecules thick with the fat-soluble portions inside shielded on both sides by the water-soluble portions. This stable structure provides the cell membrane with its integrity. While phospholipids are the major component of biological membranes, other lipid components like sphingolipids and sterols (such as cholesterol in animal cell membranes) are also found in biological membranes.

In particular, the term "lecithin" is usually used as synonym for phosphatidylcholine, a phospholipid which is the major component of a phosphatide fraction which may be isolated from either egg yolk (in Greek lekithos) or soy beans from which it is mechanically or chemically extracted using hexane. Lecithin is the principal constituent of phosphatides derived from oil-bearing seeds such as soybeans and is a byproduct in extracting soybean oil. Soybean lecithin is a mixture of diglycerides linked to the choline ester of phosphoric acid. One exemplary soybean lecithin has palmitic, stearic, palmitoleic, oleic, linoleic, linolenic, and carbon chains of 20-22 carbon atoms (including arachidonic) acids in respective proportions of about 11.7%, 4.0%, 8.6%, 9.8%, 55.0%, 4.0%, and 5.5%. Lecithin is commercially available in high purity as a food supplement and for medical uses.

In general, unless otherwise expressly stated, the words or terms used in this disclosure and the claims are intended to have their ordinary meaning to persons of skill in the art. Initially, as a general aid to interpretation, the possible definitions of the words or terms used herein are intended to be interpreted by reference to comprehensive general dictionaries of the English language published before or about the time of the earliest filing of this application for patent. In addition, after initially consulting such general dictionaries of the English language, the possible definitions of the words or terms used herein are intended to be interpreted by reference to appropriate scientific dictionaries, encyclopedias, treatises, and relevant prior art to which this invention pertains. From all the possible definitions, the one or more possible definitions that are consistent with the usage in this specification should be adopted.

Of course, terms made up of more than one word (i.e., compound terms), may not be found in general dictionaries of the English language. Compound terms are intended to be interpreted as a whole, and not by parsing the separate words of the compound term, which might result in absurd and unintended interpretations. In general, compound terms are to be interpreted as they would be understood in the art, consistent with the usage in this specification and with reference to the drawings.

It is intended that examining general dictionaries, encyclopedias, treatises, relevant prior art, and the patent record will make it possible to ascertain the appropriate meanings that would be attributed to the words and terms of the description and claims by those skilled in the art, and the intended full breadth of the words and terms will be more accurately determined. In addition, the improper importation of unintended limitations from the written description into the claims will be more easily avoided.

In general, a process of coating an animal feed to obtain a coated animal feed product is provided. The process comprises the steps of: (a) applying a first coating to the animal feed, wherein the first coating comprises at least 25% by weight of sugar selected from the group consisting of monosaccharide, disaccharide, and any combination thereof in any proportion; and (b) applying a second coating to the animal feed, wherein the second coating comprises at least 25% by weight of phospholipid.

The animal feed used in the process of the invention can be any convenient feed sources. For example, the animal feed can comprise nutritive feed selected from the group consisting of: processed nutritive grains, non-processed nutritive grains, oil seed meal, and any combination thereof in any proportion. In addition, the animal feed can further comprise feed grade roughage. Preferably, the animal feed further comprises mineral and vitamin additives.

According to the presently preferred embodiments of the invention, the step of applying the first coating to the animal feed further comprises applying the first coating to the animal feed in the range of about 3% by weight to about 25% by weight relative to the animal feed. Preferably, the step of applying the first coating to the animal feed further comprises applying a sufficient amount of the first coating to the animal feed to provide a sugar candied coating to the animal feed. It should be understood, however, that while mixing the first coating with the animal feed, it is desirable to substantially encapsulate the animal feed with the sugar coating, but it is not necessary to completely encapsulate the animal feed with the first coating.

According to the presently preferred embodiments of the invention, the step of applying the second coating to the animal feed further comprises applying the second coating to the animal feed in the range of about 0.5% by weight to about 10% by weight relative to the animal feed. Preferably, the step of applying the second coating to the animal feed further comprises applying a sufficient amount of the second coating to substantially extend the shelf life of the texture and appearance of the animal feed product relative to a product without the second coating having substantial phospholipid content. Preferably, the step of applying the second coating to the animal feed further comprises applying a sufficient amount of the second coating to substantially retard the moisture loss over time from the first coating relative to a product without the second coating having substantial phospholipid content. It should be understood, however, that while mixing the second coating with the animal feed, it is desirable to substantially encapsulate the animal feed, but it is not necessary to completely encapsulate the animal feed with the second coating. Without being limited by any theoretical explanation, it is believed that the phospholipid content of the second coating provides unexpected benefits relative to a second coating without such phospholipid content.

According to the presently most preferred embodiment of the invention, the step of applying the first coating to the animal feed and the step of applying the second coating to the animal feed, respectively, further comprise the step of mixing the fist coating and the second coating, respectively, in substantially liquid form with the animal feed. For this purpose, it may be desirable to add additional water to the sugar source used in the first coating or lower viscosity lipids to the phospholipid used in the second coating.

Preferably, the first coating comprises up to about 60% by weight of the sugar. Preferably, the sugar of the first coating is selected from the group consisting of sucrose, fructose, and any combination thereof in any proportion.

Preferably, the first coating comprises a sufficient total moisture content to be in substantially liquid form. The first coating preferably comprises a sufficient total moisture content to substantially dissolve the sugar. However, the first coating preferably comprises less than about 50% total moisture content.

Preferably, the first coating comprises at least about 60% by weight of molasses. The first coating can consist essentially of molasses. According to a presently most preferred embodiment of the invention, the molasses comprises heavy brix molasses. The first coating can further comprise added water. Preferably, the first coating comprises a sufficient amount of added water to obtain a first coating having a total moisture content in the range of about 20% by weight to about 50% by weight.

Preferably, the first coating further comprises feed grade fat. According to a presently most preferred embodiment of the invention, the first coating comprises feed grade fat in the range of about 1% by weight to about 15% by weight. Preferably, the feed grade fat of the first coating comprises vegetable oil, phospholipid, and any combination thereof in any proportion. More preferably, the feed grade fat of the first coating comprises at least about 50% by weight phospholipid. The feed grade fat of the first coating can consists essentially of phospholipid.

Preferably, the first coating further comprises inorganic acid. More preferably, the inorganic acid is selected from the group consisting of sulfuric acid, phosphoric acid, and any combination thereof in any proportion. According to a presently most preferred embodiment of the invention, the first coating comprises a sufficient amount of inorganic acid to lower the pH of the first coating to a range of about 3.5 to about 4.5. The purpose of the inorganic acid is to help lower the pH of the first coating. It is contemplated, however, that water-soluble short-chain organic acids, such as propionic acid, can also be used to help lower the pH of the first coating.

Preferably, the first coating further comprises short-chain organic acid. As used herein, the term "organic acid" includes the inorganic salt thereof. More preferably, the short-chain organic acid is selected from the group consisting of: acetic acid, propionic acid, butyric acid, any ammonium, sodium, calcium, and magnesium salt of any of the foregoing, and any combination of any of the foregoing in any proportion. Preferably, the second coating comprises short-chain organic acid in the range of about 0.1% by weight to about 2% by weight. Without being limited by any theoretical explanation, it is believed that a sufficient concentration of a short-chain organic acid is useful in the first coating as a mold inhibitor.

In addition, the first coating preferably further comprises an effective amount of a preservative. For example, the preservative is selected from the group consisting of sodium benzoate, potassium sorbate, and propionic acid. Preferably, the first coating comprises preservative in the range of about 0.01% by weight to about 2% by weight. It will be appreciated by those skilled in the art that the most appropriate concentration of the preservative at least partly depends on the kind or kinds of preservative employed in the first coating.

Preferably, the first coating further comprises flavoring. For example, the flavoring can comprise flavoring selected from the group consisting of caramel, molasses, cherry, apple and any combination thereof in any proportion. According to a presently most preferred embodiment of the invention, the first coating comprises flavoring in the range of about 0.001% to about 0.1%.

Preferably, the phospholipid of the second coating comprises phospholipid in at least about 50% by weight. It will be understood, of course, that the phospholipid of the second coating can consist essentially of phospholipid.

The phospholipid for use in the invention preferably comprises vegetable oil phospholipid. According to the presently most preferred embodiment of the invention, the phospholipid comprises lecithin. For example, the second coating preferably comprises lecithin in the range of about 60% by weight to about 85 percent by weight.

The second coating can also contain feed grade fat other than phospholipid. If other feed grade fat is employed, the feed grade fat other than phospholipid of the second coating preferably comprises vegetable oil. For example, the vegetable oil can comprise soybean oil. Further, for example, the second coating can comprise vegetable oil in the range of about 2% by weight to about 30% by weight.

Preferably, the second coating further comprises short-chain organic acid. As used herein, the term "organic acid" includes the inorganic salt thereof. Without being limited by any theoretical explanation, it is believed that short-chain organic acid is useful for mold inhibition. (As will be understood by those skilled in the art, of course, an organic acid in the form of a salt thereof would not be useful to help lower the pH of an aqueous composition.) It also believed that the short-chain organic acid is useful to improve handleability, that is, it is useful in making the lecithin a more fluid or flowable material or lowering its viscosity. For example, the short-chain organic acid for use in the second coating can be selected from the group consisting of: acetic acid, propionic acid, butyric acid, any ammonium, sodium, calcium, and magnesium salt of any of the foregoing, and any combination of any of the foregoing in any proportion. According to the presently most preferred embodiment of the invention, the second coating comprises short-chain organic acid in the range of about 0.1% by weight to about 5% by weight.

In addition, the second coating preferably further comprises short-chain, rumen-digestible polyol. The polyol must be selected to be rumen digestible because certain polyols, such as ethylene glycol, are known to be toxic to animals. Without being limited by any theoretical explanation, it is believed that the short-chain, rumen-digestible polyol helps make a more even, uniform coating. It is also believed that it may help prevent the second coating from freezing, acting, in effect, as antifreeze. More preferably, the short-chain, rumen-digestible polyol is selected from the group consisting of diols, triols, and any combination thereof in any proportion. Most preferably, the short-chain, rumen-digestible polyol is selected from the group consisting of propylene glycol, glycerin, and any combination thereof in any proportion. Preferably, the second coating comprises short-chain, rumen-digestible polyol in the range of about 0.1% by weight to about 3% by weight.

Preferably, the second coating further comprises flavoring. For example, the flavoring of the second coating can comprise flavoring selected from the group consisting of caramel, molasses, cherry, apple and any combination thereof in any proportion. By way of further example, the second coating comprises flavoring in the range of about 0.001% to about 0.1%.

The various processes according to the invention provide new coated animal feed products.

An example according to the present invention includes a process of coating an animal feed to obtain a coated animal feed product, the process comprising the steps of: (a) applying a first coating to the animal feed in an amount of about 3% by weight to about 25% by weight relative to the animal feed, wherein the first coating comprises about 85% by weight of high brix molasses, about 5% by weight added water, about 5% by weight feed grade fat, inorganic acid to lower the pH, short-chain organic acid, a preservative, and flavoring; and (b) applying a second coating to the animal feed in an amount in the range of about 0.5% by weight to about 5% by weight relative to the animal feed, wherein the second coating comprises about 94% lecithin, about 5% feed grade fat other than phospholipid, and about 0.5% by weight propylene glycol, and flavoring.

The invention includes the coated animal feed product obtained by such a process.

The invention is described with respect to presently preferred embodiments, but is not intended to be limited to the described embodiments. As will be readily apparent to those of ordinary skill in the art, numerous modifications and combinations of the various aspects of the invention and the various features of the preferred embodiment can be made without departing from the scope and spirit of the invention. The invention is to be defined by the appended claims.

What is claimed is:

1. A process of coating an animal feed to obtain a coated animal feed product, the process comprising the steps of:
   a. applying a first coating to the animal feed, wherein the first coating comprises at least 20% by weight of sugar selected from the group consisting of monosaccharide, disaccharide, and any combination thereof in any proportion; and
   b. applying a second coating to the animal feed, wherein the second coating comprises at least 20% by weight of phospholipid.

2. The process according to claim 1, wherein the animal feed comprises nutritive feed selected from the group consisting of: processed nutritive grains, non-processed nutritive grains, oil seed meal, and any combination thereof in any proportion.

3. The process according to claim 2, wherein the animal feed further comprises: feed grade roughage.

4. The process according to claim 1, wherein the step of applying the first coating to the animal feed further comprises applying the first coating to the animal feed in the range of about 3% by weight to about 25% by weight relative to the animal feed.

5. The process according to claim 1, wherein the step of applying the second coating to the animal feed further comprises applying the second coating to the animal feed in the range of about 0.5% by weight to about 10% by weight relative to the animal feed.

6. The process according to claim 1, wherein the step of applying the second coating to the animal feed further comprises applying a sufficient amount of the second coating to substantially extend the shelf life of the texture and appearance of the animal feed product relative to a product without the second coating having substantial phospholipid content.

7. The process according to claim 1, wherein the step of applying the second coating to the animal feed further comprises applying a sufficient amount of the second coating to substantially retard the moisture loss over time from the first coating relative to a product without the second coating having substantial phospholipid content.

8. The process according to claim 1, wherein the step of applying the first coating to the animal feed and the step of applying the second coating to the animal feed, respectively, further comprise the step of mixing the fist coating and the second coating, respectively, in substantially liquid form with the animal feed.

9. The process according to claim 1, wherein the first coating comprises up to about 60% by weight of the sugar.

10. The process according to claim 1, wherein the first coating comprises a sufficient total moisture content to be in substantially liquid form at ambient temperature.

11. The process according to claim 1, wherein the first coating comprises a sufficient total moisture content to substantially dissolve the sugar.

12. The process according to claim 11, wherein the first coating comprises less than about 50% total moisture content.

13. The process according to claim 1, wherein the first coating comprises at least about 60% by weight of molasses.

14. The process according to claim 13, wherein the first coating further comprises feed grade fat.

15. The process according to claim 14, wherein the first coating comprises feed grade fat in the range of about 1% by weight to about 15% by weight.

16. The process according to claim 14, wherein the feed grade fat of the first coating comprises vegetable oil, phospholipid, and any combination thereof in any proportion.

17. The process according to claim 16, wherein the feed grade fat of the first coating comprises at least about 50% by weight phospholipids.

18. The process according to claim 13, wherein the first coating further comprises inorganic acid.

19. The process according to claim 18, wherein the inorganic acid is selected from the group consisting of sulfuric acid, phosphoric acid, and any combination thereof in any proportion.

20. The process according to claim 13, wherein the first coating comprises a sufficient amount of inorganic acid to lower the pH of the first coating to a range of about 3.5 to about 4.5.

21. The process according to claim 13, wherein the first coating further comprises short-chain organic acid.

22. The process according to claim 21, wherein the short-chain organic acid is selected from the group consisting of: acetic acid, propionic acid, butyric acid, any ammonium, sodium, calcium, and magnesium salt of any of the foregoing, and any combination of any of the foregoing in any proportion.

23. The process according to claim 21, wherein the second coating comprises short-chain organic acid in the range of about 0.1% by weight to about 2% by weight.

24. The process according to claim 1, wherein the second coating further comprises feed grade fat other than phospholipid.

25. The process according to claim 1, wherein the second coating comprises phospholipid in at least about 50% by weight.

26. The process according to claim 1, wherein the second coating comprises lecithin in the range of about 60% by weight to about 85% by weight.

27. The process according to claim 25, wherein the feed grade fat other than phospholipid of the second coating comprises vegetable oil.

28. The process according to claim 25, wherein the second coating further comprises short-chain organic acid.

29. The process according to claim 28, wherein the short-chain organic acid is selected from the group consisting of: acetic acid, propionic acid, butyric acid, any ammonium, sodium, calcium, and magnesium salt of any of the foregoing, and any combination of any of the foregoing in any proportion.

30. The process according to claim 28, wherein the second coating comprises short-chain organic acid in the range of about 0.1% by weight to about 5% by weight.

31. The process according to claim 25, wherein the second coating further comprises short-chain, rumen-digestible polyol.

32. The process according to claim 31, wherein the short-chain rumen-digestible polyol is selected from the group consisting of diols, triols, and any combination thereof in any proportion.

33. The process according to claim 31, wherein the short-chain, rumen-digestible polyol is selected from the group consisting of propylene glycol, glycerin, and any combination thereof in any proportion.

34. The process according to claim 31, wherein the second coating comprises short-chain, rumen-digestible polyol in the range of about 0.1% by weight to about 3% by weight.

35. The coated animal feed product obtained by the process according to claim 1.

36. The coated animal feed product obtained by the process according to claim 24.

37. The coated animal feed product obtained by the process according to claim 32.

38. A process of coating an animal feed to obtain a coated animal feed product, the process comprising the steps of:
   a. applying a first coating to the animal feed in an amount of about 3% by weight to about 25% by weight relative to the animal feed, wherein the first coating comprises at least 60% by weight of a sugar source selected from the group consisting of molasses, corn syrup, and any combination thereof in any proportion; and
   b. applying a second coating to the animal feed in an amount in the range of about 0.5% by weight to about 10% by weight relative to the animal feed, wherein the second coating comprises:
      i. at least 25% by weight phospholipid; and
      ii. at least 0.1% by weight short-chain rumen-digestible polyol.

39. The coated animal feed product obtained by the process according to claim 38.

* * * * *